Oct. 8, 1929.        H. H. ROOT        1,730,593

HONEY EXTRACTOR

Filed Oct. 30, 1924

Inventor
Huber H. Root
By Chas. J. Williamson
Attorney

Patented Oct. 8, 1929

1,730,593

UNITED STATES PATENT OFFICE

HUBER H. ROOT, OF MEDINA, OHIO, ASSIGNOR TO THE A. I. ROOT COMPANY, OF MEDINA, OHIO, A CORPORATION

HONEY EXTRACTOR

Application filed October 30, 1924. Serial No. 746,832.

My invention relates to centrifugal honey extractors and has for its object generally stated the provision of a construction of machine which will not require the reversal of the combs, the combs being so supported for revolution that centrifugal force will act upon honey in the cells on both sides of the mid-rib to cause the simultaneous expulsion of honey therefrom, to the end that certain inherent defects in machines acting upon this principle will be overcome and a thoroughly practical machine in the commercial sense may be provided. My invention consists in whatever is described by or is included within the terms or scope of the appended claims.

Machines in which the combs are non-reversing have heretofore been proposed which act upon the general principle above stated, but a machine embodying my invention is distinguished therefrom in that the combs in their frames are mounted in planes that are parallel with the axis of revolution of the rotating support and which extend truly radially from such axis and with the top bars of the frames outermost and a machine embodying my invention has the further distinguishing characteristic that the group of radially arranged combs is enclosed on the sides and at the bottom if desired by a strainer or sieve so that while the honey is free to pass outward therethrough, any broken pieces of comb, splinters or chips from the frames, etc., will be retained and thus stoppage of the honey outlet from obstructions such as these will be avoided.

Figure 1:
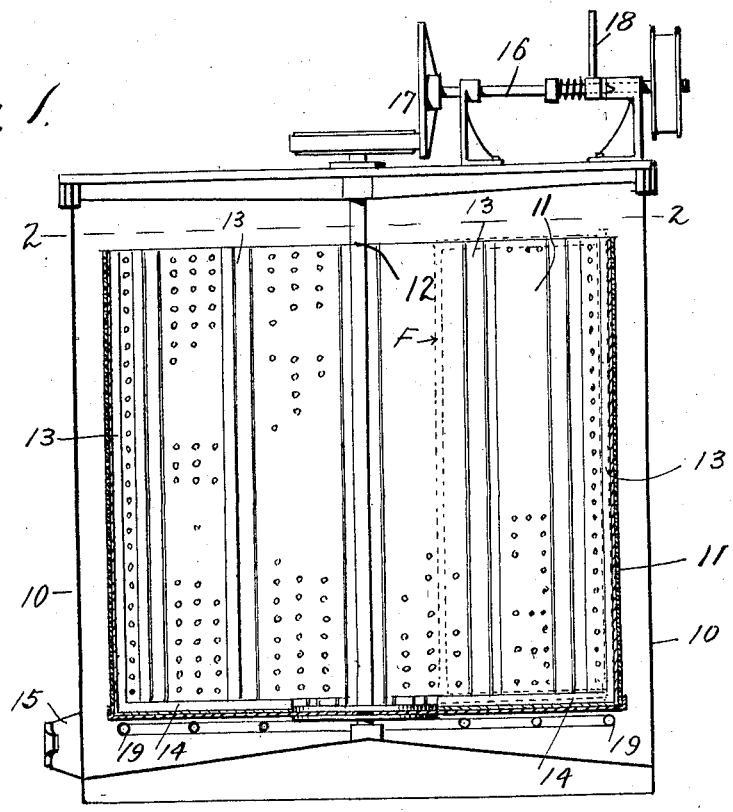
Fig. 1 is a top plan view with the cover removed of a honey extractor embodying my invention.
Figure 2:
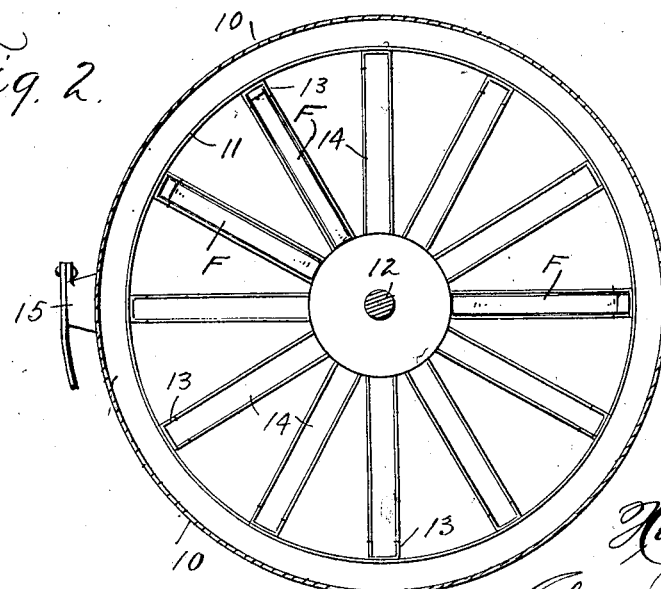
Fig. 2 is a vertical section thereof.

Referring in detail to what is shown in the drawing within a metal can, 10, of usual construction I mount a cylindrical basket, 11, with perforated or reticulated side walls and a bottom which may be solid or perforated as desired. This basket is suitably secured to a central vertical shaft, 12, journaled in bearings at top and bottom of the can, by the revolution of which the basket may be revolved at a suitable high speed which will result in the honey within the cells of the comb mounted or supported within the basket as presently described being drawn or projected outward by centrifugal force through the perforations or openings in the side walls. The frames, F, containing the comb are supported in the basket on lines that are truly radial from the center shaft, 12, the frames being stood on end with the top bars of the frame next the said walls of the basket and the bottom bars thus extending parallel with the shaft, 12, and the end bars of the frame being respectively at top and bottom of the basket. It will be seen that the honey may pass freely into the can at the sides but any broken comb or other débris which might clog the honey outlet, 15, of the can cannot pass into the can but is retained in the basket. Stopping up or choking of the outlet from which the honey is drawn by a pump would necessitate shutting down the operation to clear out the clogged outlet. Small particles of cappings from the honey could not possibly collect upon the walls of the basket sufficiently to clog the holes therein by reason of the centrifugal force which would drive them through the perforations. I show a power driven shaft, 16, geared by a friction drive, 17, with the upper end of the basket carrying shaft, 12, because economical operation of this type of honey extractor can only be accomplished when the apparatus is on a scale that requires power for its operation.

It will be seen that the necessary parts of apparatus embodying my invention result in apparatus of very simple construction and while the removal of honey is not as quickly done per comb as with a reversing type of extractor, that is more than off-set by the greater quantity of combs which can be placed in the machine at a time and also by the simplification of the apparatus.

It is necessary to successful operation of my radial type of extractor that the basket or comb support start at a slow speed and accelerate very slowly until a maximum speed is reached and then for a considerable period the combs are revolved at that speed with the result that all the honey is removed from the cells. The driving mechanism shown in the drawings has the characteristic of thus revolving the basket.

The driving wheel of the friction drive, 17, is carried by the driving shaft, 16, so that it may be moved axially with said shaft by rotating a hand lever, 18, so as to vary the degree of pressure between the two wheels and thus the speed of revolution of the shaft, 12, may be varied so that the comb carrier may be started to revolve at a slow speed and the speed gradually increased, the pressure being substantially increased when about one-third or two-thirds of the honey has been expelled so that the speed much more rapidly increases until the desired maximum is reached. Other forms of variable speed gearing may be employed for example the driven wheel on the shaft, 12, may be mounted so as to be capable of an axial movement produced either automatically or by hand by which its point of contact with the driving wheel will shift radially, and the well known arrangement of cone pulleys may be employed.

Preferably heat is applied so that the honey will flow more freely and the application of heat to a large extent retards granulation. A steam or hot water jacket may be applied to the can, 10, or as shown in the drawings a coil of pipe, 19, may be placed in the bottom of the can, 10, through which steam or hot water from a suitable source is circulated.

The frames containing the honey may, of course, be supported in the basket in various ways. For example the basket might have concentric rings or inner and outer circles and provided with radial notches to engage the end bars and top bars of each frame. Or as shown in the drawings there may be vertical channels, 13, secured to the inner side walls of the basket to receive each a top bar of a frame and for the lowermost end bar of each frame there may be a similar channel, 14, extending radially.

What I claim is:

1. A centrifugal honey extractor having a can or receptacle with a honey outlet, a rotatable support mounted within the receptacle having a circular perforated straining wall spaced from the interior wall of the receptacle and means fixedly to support frames containing the combs within said wall and in planes radial to the axis of revolution of the support.

2. A centrifugal honey extractor having a can or receptacle with a honey outlet, a rotatable support mounted within the receptacle having a circular perforated straining wall spaced from the interior wall of the receptacle and means fixedly to support frames containing the combs within said wall and in planes radial to the axis of revolution of the support, comprising frame-bar engaging means on the interior of said wall that space said frames radially.

3. A centrifugal honey extractor having a can or receptacle with a honey outlet, a rotatable support mounted within the receptacle having a circular perforated straining wall spaced from the interior wall of the receptacle and means fixedly to support frames containing the combs within said wall and in planes radial to the axis of revolution of the support, comprising frame-bar engaging means on the interior of said wall that space said frames radially, and a bottom from which said wall rises having frame-bar engaging means.

In testimony whereof I hereunto affix my signature.

HUBER H. ROOT.